United States Patent
Takahashi et al.

[11] Patent Number: 5,980,989
[45] Date of Patent: Nov. 9, 1999

[54] GAS SEPARATOR AND METHOD FOR PREPARING IT

[75] Inventors: Tomonori Takahashi, Chita; Shinichi Kosaka, Nagoya, both of Japan

[73] Assignee: NGK Insulators, Ltd., Nagoya, Japan

[21] Appl. No.: 08/602,845

[22] PCT Filed: Jun. 28, 1994

[86] PCT No.: PCT/JP94/01046

§ 371 Date: Feb. 26, 1996

§ 102(e) Date: Feb. 26, 1996

[87] PCT Pub. No.: WO96/00608

PCT Pub. Date: Jan. 11, 1996

[51] Int. Cl.$^6$ ............ B01D 67/00; B01D 69/00
[52] U.S. Cl. ............ 427/294; 96/11; 96/12; 427/443.1
[58] Field of Search ............ 502/400; 96/12, 96/11; 428/315.5; 55/16; 427/129, 294, 443.1

[56] References Cited

U.S. PATENT DOCUMENTS

| | | | |
|---|---|---|---|
| 2,824,620 | 2/1958 | Rosset | 183/2 |
| 3,359,705 | 12/1967 | Mullhaupt | 55/16 |
| 4,496,373 | 1/1985 | Behr et al. | 55/16 |
| 5,332,597 | 7/1994 | Carolan et al. | 427/243 |
| 5,518,530 | 5/1996 | Sakai et al. | 96/11 |

FOREIGN PATENT DOCUMENTS

| | | |
|---|---|---|
| 62-273030 | 11/1987 | Japan. |
| 63-171617 | 7/1988 | Japan. |
| 3-146122 | 6/1991 | Japan. |
| 3-288534 | 12/1991 | Japan. |
| 5-123548 | 5/1993 | Japan. |
| 5-285356 | 11/1993 | Japan. |
| 6-114230 | 4/1994 | Japan. |
| 6-142471 | 5/1994 | Japan. |
| 6-277472 | 10/1994 | Japan. |

OTHER PUBLICATIONS

*Industrial and Engineering Chemistry Research*, "Thin palladium membrane formed in support pores by metal organic chemical vapor deposition . . . " vol. 33, No. 3, 1994, Mar. 1994.

Uemiya, S., et al. "A Palladium/Porous–Glass Composite Membrane . . . ", Chemistry Letters, 1988, pp. 1687–1690, Mar. 1988.

Patent Abstracts of Japan, vol. 012, No. 159 (C–495), May 14, 1988, & JP 62 273029 A (ISE Kagaku Kogyo KK), Nov. 27, 1987.

Patent Abstracts of Japan, vol. 17, No. 205 (C–1051), Apr. 22, 1993 & JP 04 349926 A (Mitsubishi Heavy Ind. Ltd.), Dec. 4, 1992.

*Primary Examiner*—Wayne Langel
*Assistant Examiner*—Peter DiMauro
*Attorney, Agent, or Firm*—Kubovcik & Kubovcik

[57] ABSTRACT

A gas separator is here disclosed in which a metal for separating a gas is filled into pores opened on the surface of a porous substrate to close them. The thus constituted gas separator can prevent a material gas from leaking into a purified gas. A method for preparing the gas separator is also disclosed which comprises an activation step of immersing the porous substrate having a pair of surfaces in a solution containing an activated metal, while a pressure difference is set between the pair of surfaces, and a chemical plating step of filling the metal for separating the gas into the pores opened on the surface of the porous substrate to close these pores by chemical plating.

2 Claims, 2 Drawing Sheets

GAS SEPARATOR AND METHOD FOR PREPARING IT

TECHNICAL FIELD

The present invention relates to a gas separator for separating a specific gas from a mixed gas by diffusion, and a method for preparing the same.

BACKGROUND ART

Heretofore, as a technique for obtaining a specific gas from a mixed gas, there is known a separation method by the use of an organic or an inorganic gas separating film. Among the separating films, examples of a hydrogen separating film for use in a film separation method include organic polymeric films of polyimide, polysulfone and the like, and inorganic compound films of palladium, palladium alloys and the like, and examples of an oxygen separating film include films of silver and silver alloys. The palladium film and the palladium alloy films have heat resistance and can obtain extremely high-purity hydrogen.

Palladium and the palladium alloys have characteristics which allow hydrogen to be dissolved therein and which allow hydrogen to permeate therethrough, and by the utilization of the characteristics, a thin film comprising palladium or the palladium alloy has been widely used as a gas separator for separating hydrogen from a mixed gas containing hydrogen. However, the thin film comprising palladium itself is weak in mechanical strength, and so, in Japanese Patent Application Laid-open No. 273030/1987, palladium or the palladium alloy is deposited on the surface of an inorganic porous support of a porous glass, porous ceramics, a porous aluminum oxide or the like to increase the mechanical strength of the thin film comprising palladium or the palladium alloy.

Japanese Patent Application Laid-open No. 146122/1991 discloses a method for preparing a hydrogen separator which comprises first forming a palladium thin film on the surface of a heat-resistant porous substrate by a chemical plating process, and further forming a silver thin film on the palladium thin film by the chemical plating process, followed by a heat treatment. According to this disclosed method, the hydrogen separator having the porous substrate and the palladium alloy thin film covering it can be obtained. In this palladium alloy thin film, palladium and silver are uniformly distributed by the above-mentioned heat treatment.

In addition, U.S. Pat. No. 3,359,705 discloses a silver thin film for separating oxygen.

However, these gas separators have a drawback that a material gas to be subjected to the gas separation leaks into a purified gas through holes (hereinafter referred to as "throughhole-defects") which extend through the gas separating film comprising the metal for separating the gas. Therefore, the concentration of hydrogen in the purified gas deteriorates as much as the leaked material gas. For example, Japanese Patent Application Laid-open No. 273030/1987 discloses a method for preparing a hydrogen separating film using palladium or the palladium alloy in which the surface of an inorganic porous material is chemically activated, and the palladium thin film is then deposited thereon by the chemical plating process. However, the palladium film formed by the chemical plating process has the holes extending through the palladium film, and the material gas inconveniently flows into the purified gas through these holes. In the method disclosed in this publication, the palladium film is formed on the surface of the porous material, but this palladium film is not formed in the pores.

Furthermore, in Japanese Patent Application Laid-open No. 171617/1988, there is disclosed a method for preparing a hydrogen separating film in which palladium is supported on an inorganic porous film, and this method comprises vapor-depositing palladium or the palladium alloy on the inorganic porous film by sputtering or the like, immersing it in an aqueous $[Pd(NH_3)_4]Cl_2$ solution, and then carrying out a vacuum deaeration treatment via the inorganic porous film to vaporize a solvent, thereby supporting palladium on the inorganic porous film. However, according to an example, this hydrogen separating film allows not only hydrogen but also nitrogen to permeate therethrough, and therefore it is apparent that the pores in the inorganic porous film are not closed with palladium. Moreover, palladium is held on the porous film by depositing it or vaporizing the solvent from the aqueous palladium solution, but the laid-opened publication has not any description regarding a chemical plating method for reducing divalent palladium ions contained in $[Pd(NH_3)_4]Cl_2$.

The silver thin film disclosed in U.S. Pat. No. 3,359,705 and the hydrogen separator described in Japanese Patent Application Laid-open No. 146122/1991 have a similar problem that the material gas flows into the purified gas.

In order to remove these throughhole-defects, there is a method of thickening the gas separating film comprising the metal for separating the gas, but this method has a problem that a gas permeability of the gas separating film deteriorates and hence a gas separation efficiency also deteriorates.

Additionally, this method also has a problem that adhesive properties between the gas separating film and a substrate such as the porous film are weak, and when the hydrogen separator obtained by the method is actually used in a gas separation process, the gas separating film peels in a short period of time. In consequence, such a hydrogen separator cannot be used continuously for a long term in order to do the gas separation.

DISCLOSURE OF THE INVENTION

Thus, the present invention is made on the background of the problems of the above-mentioned conventional techniques, and an object of the present invention is to provide a gas separator which can prevent a material gas to be subjected to a gas separation from leaking into a purified gas.

The present invention provides a gas separator comprising a porous substrate having pores opened on its surface and a metal for separating a gas, said metal for separating the gas being filled into the pores in the porous substrate to close them.

In the present invention, the metal for separating the gas preferably covers at least a portion of the surface of the porous substrate to form a thin film thereon.

Furthermore, in the present invention, a depth of the metal for separating the gas which penetrates into the porous substrate is preferably in the range of 1 to 30 μm from the surface of the porous substrate.

In the present invention, the metal for separating the gas is preferably palladium, an alloy mainly comprising palladium or an alloy containing palladium.

The present invention provides a method for preparing a gas separator having a porous substrate with a pair of surfaces which comprises an activation step of immersing the porous substrate in a solution containing an activated metal, while a pressure difference is set between the pair of surfaces of the porous substrate, whereby the solution is allowed to penetrate into pores opened on one of the pair of surfaces of the porous substrate, and a chemical plating step of depositing a metal for separating the gas in the pores in the porous substrate by chemical plating, whereby the metal for separating the gas is filled into the pores to close them.

Furthermore, according to the present invention, there is provided a method for preparing a gas separator which has an activation step and a chemical plating step, and in the activation step, one surface of the porous substrate is immersed in a solution containing an activated metal so that the pressure applied on the one surface may be higher than the pressure applied on the other opposite surface of the porous substrate, whereby the solution is allowed to penetrate into pores opened on the one surface of this porous substrate, and in the chemical plating step, a metal for separating a gas is deposited in the pores in the porous substrate, whereby the metal for separating the gas is filled into the pores to close them.

In the present invention, the metal for separating the gas is preferably palladium, an alloy mainly comprising palladium or an alloy containing palladium.

BEST MODE FOR CARRYING OUT THE INVENTION

Figure 1:
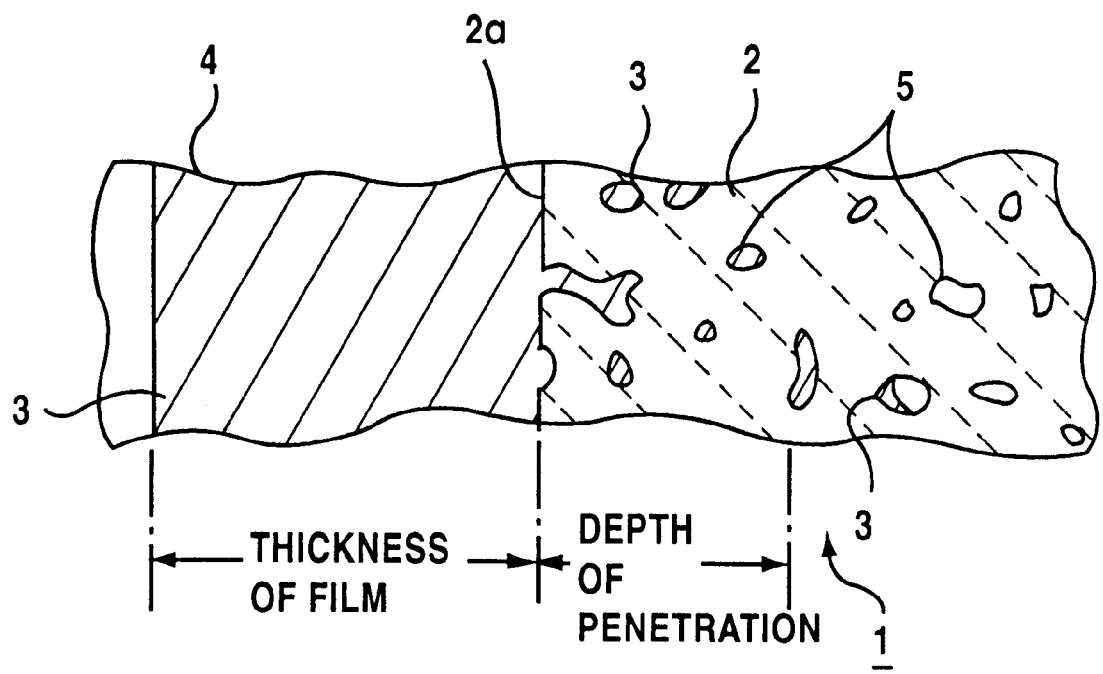
FIG. 1 is an illustrative view showing a section of a gas separator of the present invention.

A gas separator 1 of the present invention has a porous substrate 2 and a metal 3 for separating a gas. The porous substrate 2 is porous, and so it has many pores 5, and some of the pores extend to the surface of the porous substrate 2 and they are opened thereon. In the present invention, the metal 3 for separating the gas is filled into the pores 5 opened on a porous substrate surface 2a to close them. In consequence, when a material gas to be subjected to a gas separation by the gas separator 1 is passed through the pores 5 in the porous substrate 2, a specific gas permeates the metal 3 for separating the gas, thereby separating the specific gas from the material gas. Furthermore, in the gas separator 1 of the present invention, the metal 3 for separating the gas is filled into the pores 5 to close them, so that the material gas is prevented from leaking into a purified gas. Therefore, for example, in the case of the gas separator of the present invention in which a palladium alloy is used, a hydrogen gas having a purity of 99% or more can be obtained, and usually, the hydrogen gas having a purity of 99.9% or more can be obtained.

As the porous substrate 2, a material which does not react with the material gas is preferable. Typical examples of the porous substrate 2 include alumina, silica, silica-alumina, mullite, cordierite, zirconia, carbon, porous metals and porous glasses.

This porous substrate has many three-dimensionally connected fine pores. The diameter of these pores is preferably in the range of 0.003 to 20 μm, more preferably 0.005 to 5 μm, most preferably 0.01 to 1 μm. If the pore diameter is less than 0.003 μm, resistance to the passage of the gas is large. On the other hand, if it is more than 20 μm, when the metal 3 for separating the gas is deposited on and filled into the pores by chemical plating to close them, an excessively long reaction time is required inconveniently. Moreover, when a film, i.e., a gas separating film 4 covering the porous substrate 2 is present, pinholes are liable to be formed in the gas separating film 4 inconveniently. Such a porous substrate can be obtained, for example, by a process described in Japanese Patent Application Laid-open No. 273030/1987.

The diameter of the pores in the porous substrate is preferably uniformized, because the uniform diameter permits easily regulating the depth of a solution which penetrates into the porous substrate in the activation step or the chemical plating step, and thus permits easily and uniformly maintaining the depth of the metal for separating the gas which penetrates in the porous substrate. No particular restriction is put on the thickness of the porous substrate 2, so long as the porous substrate 2 can hold a sufficient mechanical strength in a use environment.

Moreover, the porous substrate 2 preferably has a planar shape, and the planar shape include a plane shape and a curved shape. In addition, it naturally includes a tubular shape which corresponds to a closed curved shape. In the case of the tubular shape, the shape of its section is optional, but the tubular substrate having a circular section is easily available and preferable. Furthermore, the gas separator or the porous substrate 2 may have a plate shape. In this case, it can take an optional shape in compliance with its use purpose. The porous substrate preferably has a pair of surfaces.

The kind of metal 3 for separating the gas depends upon the kind of gas to be purified. For example, in order to purify a hydrogen gas, palladium, an alloy mainly comprising palladium or an alloy containing palladium is selected. For the sake of the separation of oxygen, a thin film of silver or an alloy mainly comprising silver, or a thin film of an organic material is used.

In the present invention, as shown in FIG. 1, the metal 3 for separating this gas is filled into the pores 5 opened on the surface 2a of the porous substrate 2 to close these pores 5. In FIG. 1, the metal 3 covers the surface 2a of the porous substrate 2 to form the gas separating film 4. However, in the gas separator 1 of the present invention, the metal 3 for separating the gas present in the porous substrate 2 functions to separate the gas, and hence such a gas separating film 4 as shown FIG. 1 is not essential.

However, it is preferable that the metal 3 for separating the gas covers at least a part of the surface 2a of the porous substrate 2 to form the gas separating film 4 thereon, because the permeation of the gas to be purified through the metal 3 for separating the gas can be more assured. In this case, the metal 3 may cover a part alone of the porous substrate surface 2a, whereby in the covered part, the permeation of the gas to be purified through the metal 3 for separating the gas can be more assured.

The gas separating film 4 preferably covers the porous substrate surface 2a. The metal 3 for separating the gas, which is filled into the pores opened on the surface of the porous substrate to close these pores, is preferably continuously connected with the metal for separating the gas which constitutes the gas separating film 4, as shown in FIG. 1, whereby adhesion between the gas separating film 4 and the porous substrate can be improved and the peeling of the gas separating film 4 from the porous substrate surface 2a can be sufficiently prevented.

The thickness of the gas separating film 4 is preferably 50 μm or less, more preferably 20 μm or less. If the thickness of the gas separating film 4 is in excess of 50 μm, a long time is taken for the material gas to diffuse in the gas separating film at the time of gas separation by the gas separator, so that a treatment time is prolonged inconveniently.

The depth of the metal 3 for separating the gas which penetrates into the porous substrate 2 is preferably in the range of 1 to 30 μm, more preferably 1 to 20 μm, most preferably 1 to 10 μm from the surface of the porous substrate. If this depth is less than 1 μm, the closure of the pores with the metal 3 for separating the gas is not sufficient, and the material gas may leak into the purified gas. In addition, when the gas separating film 4 is formed, this gas separating film 4 is liable to peel from the porous substrate surface 2a. On the other hand, if this depth is more than 30 μm, a long time is taken for the gas to be separated to diffuse in the metal 3 for separating the gas at the time of gas separation by the gas separator 1, so that a gas separation time is prolonged inconveniently.

In the case that the porous substrate 2 has a tubular shape, the surface 2a of the porous substrate having the pores into which the metal 3 for separating the gas is filled may be present on an outer side or an inner side of the tubular porous substrate.

In the case that the metal 3 for separating the gas comprises a palladium alloy, the content of metals other than palladium is preferably in the range of 10 to 30% by weight, as described in "Hydrogen Permeable Palladium-Silver Alloy Membrane Supported on Porous Ceramics", Journal of Membrane Science, Vol. 56, p. 315–325 (1991) and Japanese Patent Application Laid-open No. 295402/1988. The main purpose of using palladium in the form of the alloy is to prevent the embrittlement of palladium with hydrogen and to improve a separation efficiency at a high temperature. It is preferable for the prevention of the embrittlement of palladium with hydrogen to contain silver as a metal other than palladium.

Next, a method for preparing the gas separator regarding the present invention will be described in detail.

The method for preparing the gas separator of the present invention has an activation step and a chemical plating step. In this activation step, one surface of the porous substrate is immersed in a solution containing an activated metal so that the pressure applied to the one surface may be higher than the pressure applied to the other opposite surface of the porous substrate, whereby the solution is allowed to penetrate into the pores opened on the one surface of the porous substrate to which the higher pressure is applied. Owing to the presence of such a pressure difference, the activated metal can be deposited not only on the surface of the porous substrate but also on the inner surfaces of the pores opened on the surface of the porous substrate. On the surface on which the activated metal has been deposited, a metal for separating the gas will be further deposited by the next chemical plating step.

In this activation step, the one surface of the porous substrate onto which the higher pressure is applied is required to be immersed in the solution, but the other opposite surface does not have to be immersed in the solution. For example, in the case that the tubular porous substrate is used, its outer surface may be immersed in the solution containing the activated metal, and the inside portion of the tube can be sucked by a vacuum pump. Alternatively, the outer surface of the tubular porous substrate may be immersed in the solution containing the activated metal, and the pressure may be applied to this solution to maintain the inside portion of the tube at a constant pressure. In either case, the outer surface and the inner surface of the tube can be inverted, and the inner surface of the tube is immersed in the solution and the pressure can be changed.

As the activated metal, a compound containing divalent palladium ions can be suitably used. Concretely, the activation step can be achieved by alternately immersing the porous substrate in an aqueous hydrochloric acid solution of palladium chloride and an aqueous hydrochloric acid solution of tin chloride, and while the immersion is done in either solution, the predetermined pressure difference is preferably maintained.

In the next chemical plating step, electroless plating is carried out by the use of at least the metal for separating the gas and a plating solution containing a reducing agent to deposit the metal for separating the gas in the pores of the porous substrate, whereby the metal for separating the gas is filled into the pores to close them. In this chemical plating step, the one surface of the porous substrate already treated in the above-mentioned activation step is treated. For example, the chemical plating step can be achieved by replacing the above-mentioned solution used in the activation step with the suitable plating solution.

Also in this chemical plating step, it is preferable that one surface of the porous substrate is immersed in the plating solution containing at least the metal for separating the gas and the reducing agent so that the pressure applied to the one surface may be higher than the pressure applied to the other opposite surface of the porous substrate, in the same manner as in the above-mentioned activation step. This pressure difference makes it easy for the plating solution to permeate into the pores opened on the surface of the porous substrate. As described above, the portion on which the activated metal has been deposited in the activation step is plated in this chemical plating step.

The depth of the penetrated metal for separating the gas from the surface of the porous substrate can be adjusted by controlling an immersion time in the chemical plating step, a temperature of the plating solution, a difference between the pressures applied to both the surfaces of the porous substrate, and the like.

For the sake of the hydrogen separation, a known chemical plating solution containing palladium is used, and for the oxygen separation, a known chemical plating solution containing, for example, silver nitrate, EDTA, aqueous ammonia and hydrazine is used.

In the case that the gas separator for separating hydrogen is prepared, it is preferable that after the chemical plating of palladium, silver is further chemically plated on the palladium-deposited surface, followed by a heat treatment, to mutually diffuse palladium and silver and to thereby form an alloy of palladium and silver.

EXAMPLES

Now, the present invention will be described in detail with reference to examples.

Examples 1–3

In the first place, a porous substrate was subjected to an activation treatment. A porous α-alumina cylindrical tube having an outer diameter of 10 mm, an inner diameter of 7 mm, a length of 300 mm and a fine pore diameter of 0.1 μm was used. The outer surface of this alumina tube was immersed for 1 minute in a 0.1% aqueous hydrochloric acid solution containing 0.1% by weight of $SnCl_2.2H_2O$, and on the other hand, the inside portion of the tube was sucked by a vacuum pump to reduce the pressure of the inside portion. Next, the outer surface of this tube was immersed for 1 minute in a 0.1% aqueous hydrochloric acid solution containing 0.01% by weight of $PdCl_2$. At the time of the immersion, the inside portion of the tube was sucked by the vacuum pump to reduce the pressure of the inside portion. This immersion treatment was repeated 10 times in each of both the aqueous hydrochloric acid solutions.

Next, palladium was chemically plated. $[Pd(NH_3)_4]Cl_2 \cdot H_2O$ (5.4 g), 2Na.EDTA (67.2 g), aqueous ammonia having an ammonia concentration of 28% (651.3 ml) and $H_2NNH_2 \cdot H_2O$ (0.46 ml) were added to 1 l of deionized water to prepare an aqueous solution, and the outer surface of the porous alumina tube which had been subjected to the above-mentioned activation treatment was immersed in this aqueous solution whose temperature was controlled to 50° C. This immersion time was changed to adjust a thickness of a thin film covered on the surface of the porous substrate and a depth of the solution which penetrated into the porous substrate.

Next, silver was chemically plated. $AgNO_3$ (3.46 g), 2Na.EDTA (33.6 g), aqueous ammonia having an ammonia concentration of 28% (651.3 ml) and $H_2NNH_2 \cdot H_2O$ (0.46 ml) were added to 1 l of deionized water to prepare an aqueous solution, and the outer surface of the porous alumina tube which had been subjected to the above-mentioned activation treatment was immersed in this aqueous solution whose temperature was controlled to 50° C. This immersion time was changed as shown in Table 1, and silver was then chemically plated so that a weight ratio of palladium:silver might be 80:20.

In the last place, the thus treated porous alumina tube was maintained at 900° C. for 12 hours to carry out a heat treatment, whereby palladium and silver were mutually diffused, and an alloy of palladium and silver was formed to obtain a gas separator.

For the thus obtained gas separator, an airtight test was carried out. An argon gas was introduced into an outer peripheral portion of the alumina tube, and a pressure of 9 kg weight/$cm^2$ was maintained. At this time, an amount of the gas leaked into the alumina tube was measured.

Figure 2:
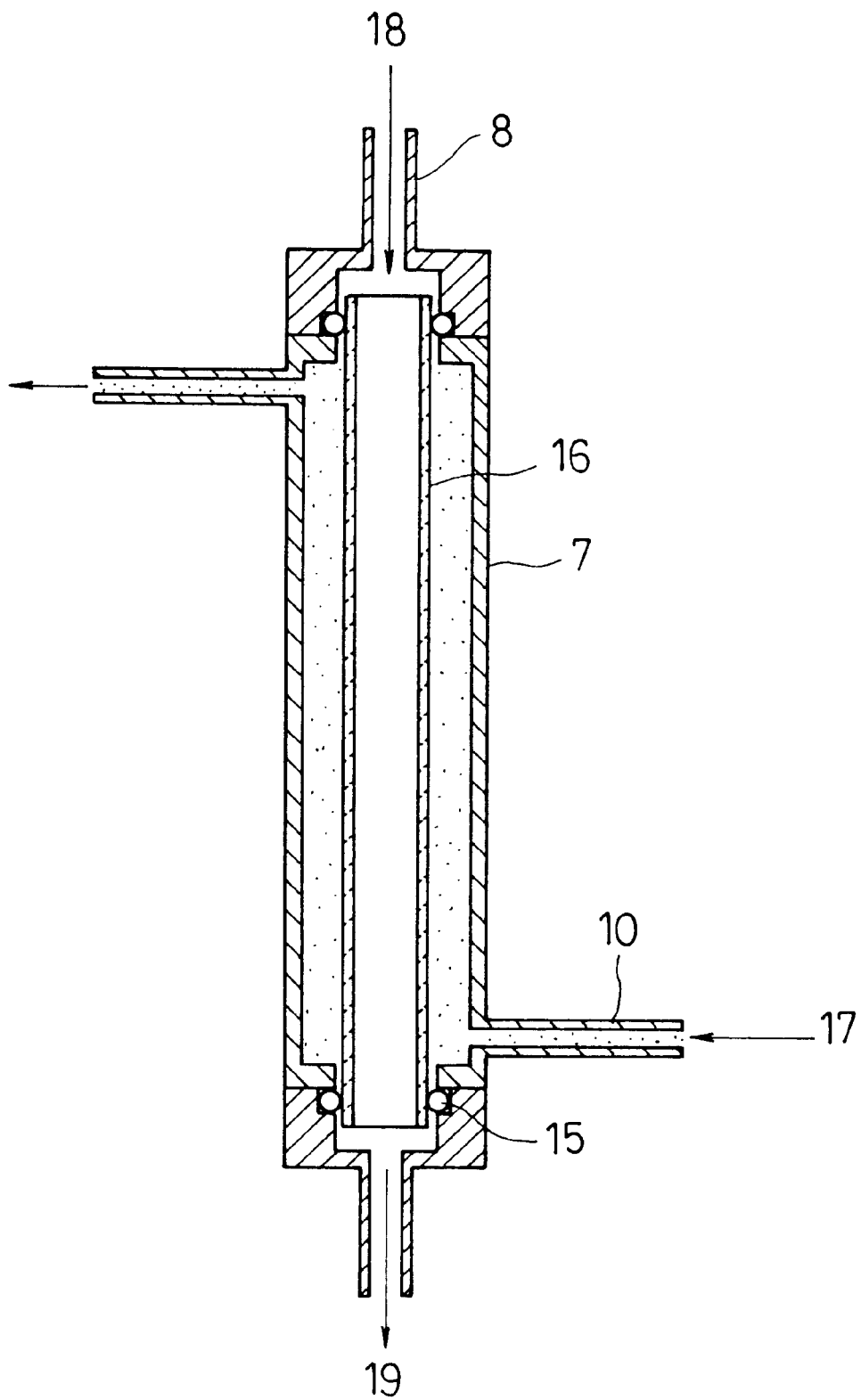
FIG. 2 is an illustrative view for the description of a gas purification method using the gas separator of the present invention.

Furthermore, for the gas separator, a hydrogen separation test was carried out. A mixed gas comprising 80% by volume of hydrogen and 20% by volume of carbon dioxide was used as a material gas. A schematic view of a test device is shown in FIG. 2. First, a chamber 7 was heated up to 500° C. Next, the above-mentioned mixed gas 17 having a pressure of 9 kg weight/$cm^2$ was introduced into the outer peripheral portion of an alumina tube 6 at 2 N liter (i.e., a volume at room temperature was 2 liters) per minute. Argon having a pressure of 1 kg weight/$cm^2$ was introduced as a sweep gas 18 into the alumina tube at 0.1 N liter per minute. A purified gas 19 thus obtained was quantitatively analyzed by a gas chromatography to inspect a gas permeation rate of the purified gas and a hydrogen concentration in the purified gas.

Incidentally, in FIG. 2, a mixed gas 17 to be separated was introduced into the outer peripheral portion of a gas separator 16 through an inlet pipe 10. The sweep gas 18 which was a separated hydrogen gas was introduced into the gas separator 16 through an inlet pipe 8. O-rings 15 surround the outer peripheries of the gas separator 16 at its both end portions to prevent the leakage of the gas.

For example, in Example 1, a gas permeation rate per minute in 1 $cm^2$ of the palladium film of the gas separator was 18 ml, and a hydrogen purity of a purified gas 19 was 99.99% or more.

Furthermore, for the gas separator, a thermal cycle test was carried out. The gas separator in a hydrogen atmosphere was heated from room temperature to 500° C., and then cooled to the room temperature. The cycle of the heating-cooling was repeated 20 times.

The results of the airtight test, the separation test and the thermal cycle test are shown in Table 1.

TABLE 1

| | Gas Separator | | |
|---|---|---|---|
| | Film Thickness ($\mu$m) | Depth ($\mu$m) | Airtight Test Leaked Gas (ml/$cm^2 \cdot$ min) |
| Example 1 | 15 | 5 | 0.01 or less |
| Example 2 | 5 | 5 | 0.01 or less |
| Example 3 | 1 | 4 | 0.01 or less |
| Comp. Ex. 1 | 20 | 0.5 | 2 |
| Comp. Ex. 2 | 10 | 0.5 | 5 |
| Comp. Ex. 3 | 5 | 0.5 | 11 |

| | Gas Separation Test | | |
|---|---|---|---|
| | Purified Gas (ml/$cm^2 \cdot$ min) | Hydrogen Purity (%) | Thermal Cycle Test (20 times) |
| Example 1 | 18 | 99.9 or more | Not changed |
| Example 2 | 35 | 99.0 or more | Not changed |
| Example 3 | 65 | 99.0 or more | Not changed |
| Comp. Ex. 1 | 20 | 90 | Peeled (at 9th cycle) |
| Comp. Ex. 2 | 39 | 87 | Peeled (at 13th cycle) |
| Comp. Ex. 3 | 70 | 84 | Not changed |

Comparative Examples 1–3

In each comparative example, a treatment was carried out under the same conditions as in the above examples except that the pressure in the inside portion of an alumina tube was not reduced in a porous substrate activation step. The results are shown in Table 1.

Comparing the examples to the comparative examples, it is apparent that palladium can be deposited even within the porous substrate by reducing the pressure in the alumina tube. Additionally, it is also apparent that since a palladium alloy can be filled even into pores in the porous substrate to close these pores, the airtight of the gas separator can be improved, and a hydrogen purity in the purified gas can be remarkably improved.

The thermal cycle test is also a parameter indicating adhesive properties of the gas separating film to the porous substrate in the gas separator. Comparing the examples to the comparative examples, it is apparent that in the examples, the peeling of the gas separating film from the porous substrate is more difficult, which indicates that the adhesive properties of the gas separating film to the porous substrate are improved, because in the examples, the metal for separating the gas is filled into the pores opened on the surface of the porous substrate to close them.

In the gas separator of the present invention, the metal for separating the gas is filled into the pores opened on the surface of the porous substrate to close them, whereby the material gas to be subjected to the gas separation by the gas separator can be prevented from leaking into the purified gas. Therefore, for example, according to the gas separator of the present invention using a palladium alloy, a hydrogen gas having a purity of 99.9% or more can be obtained.

Possibility of Industrial Utilization

Furthermore, when a gas separator of the present invention has a gas separating film comprising a metal for separating a gas on the surface of a porous substrate, the metal for separating the gas is filled into the pores opened on the surface of the porous substrate to close them, and thus the adhesive properties of the gas separating film to the porous substrate can be improved. This effect is more remarkable, as compared with the gas separator covering the surface of the porous substrate without filling the gas separating film into the pores opened on the surface of the porous substrate.

With regard to a method for preparing the gas separator of the present invention, in its activation step, the porous substrate having a pair of surfaces is immersed in a solution containing an activated metal, while a pressure difference is set between the pair of surfaces, whereby the solution is allowed to penetrate into the pores opened on its one surface. Next, in a chemical plating step, a metal for separating the gas is deposited in the pores in the porous substrate, whereby the metal for separating the gas is filled into the pores to close them.

By the use of the gas separator of the present invention, a specific gas such as hydrogen can be obtained in a high purity from a mixed gas.

We claim:

1. A method for preparing a gas separator having a porous substrate with a pair of opposing surfaces which comprises:

an activation step of immersing the porous substrate in a solution containing an activated metal, while a pressure difference is set between the pair of opposing surfaces of the porous substrate, whereby the solution is allowed to penetrate into pores that open onto one of the pair of opposing surfaces of the porous substrate, and a chemical plating step of depositing a metal for separating the gas in the pores in the porous substrate by chemical plating, whereby the metal for separating the gas is deposited or impregnated into the pores and closes them.

2. The method for preparing a gas separator according to claim 1 wherein the metal for separating the gas is palladium, an alloy mainly comprising palladium or an alloy containing palladium.

* * * * *